(12) United States Patent
Asahara et al.

(10) Patent No.: US 10,962,407 B2
(45) Date of Patent: Mar. 30, 2021

(54) GRASS MOWER HAVING ROTATABLE BLADE

(71) Applicant: KUBOTA CORPORATION, Osaka (JP)

(72) Inventors: Masato Asahara, Hyogo (JP); Phillip Sutton, Jr., Gainesville, GA (US); Kazuhiro Ochi, Sakai (JP); Shoichiro Nagaishi, Sakai (JP); Akira Minoura, Osaka (JP); Yuto Fujii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 151 days.

(21) Appl. No.: 16/233,845

(22) Filed: Dec. 27, 2018

(65) Prior Publication Data

US 2020/0209052 A1 Jul. 2, 2020

(51) Int. Cl.
*G01H 1/00* (2006.01)
*A01D 34/81* (2006.01)
*A01D 34/82* (2006.01)
*A01D 34/66* (2006.01)
*A01D 101/00* (2006.01)

(52) U.S. Cl.
CPC ............ *G01H 1/003* (2013.01); *A01D 34/81* (2013.01); *A01D 34/82* (2013.01); *A01D 34/66* (2013.01); *A01D 2101/00* (2013.01)

(58) Field of Classification Search
CPC ........ A01D 34/81; A01D 34/82; A01D 34/66; G01H 1/003
See application file for complete search history.

(56) References Cited

U.S. PATENT DOCUMENTS

| 7,784,254 | B2 | 8/2010 | Bever | |
| 8,544,570 | B2* | 10/2013 | Ishii | B60L 50/40 |
| | | | | 180/6.5 |
| 9,173,346 | B2* | 11/2015 | Koike | A01D 69/02 |
| 2014/0116017 | A1* | 5/2014 | Hunt | A01D 34/64 |
| | | | | 56/10.2 R |
| 2017/0213441 | A1* | 7/2017 | Welin | G01H 3/10 |
| 2018/0338414 | A1* | 11/2018 | Manji | B60L 15/2036 |

* cited by examiner

*Primary Examiner* — Abigail A Risic
(74) *Attorney, Agent, or Firm* — Greenblum & Bernstein, P.L.C.

(57) ABSTRACT

A mower unit provided in a grass mower unit includes a mower deck having a top plate and a side plate extending downwards from the top plate, a rotational shaft extending through the top plate and rotatably supported to the top plate, and a blade attached to the rotational shaft inside the mower deck. A vibration detection unit is attached to the mower deck for detecting vibration in the mower deck. Vibration detected by the vibration detection unit is informed via an informing unit.

10 Claims, 4 Drawing Sheets

GRASS MOWER HAVING ROTATABLE BLADE

TECHNICAL FIELD

This invention relates to a grass mower that mounts a mower unit having a mower deck accommodating a rotatable blade.

BACKGROUND ART

A blade which is rotated during traveling of a grass mower can be damaged due to its contact with a stone, a root of a plant, etc. And, such contact invites attachment failure of the blade. Damage of the blade and attachment failure of the blade lead to deterioration in the cutting performance of the blade. For this reason, maintenance of the blade is essential. A damaged blade will be replaced by a new blade. For this reason, the art has proposed a grass mower that allows easy and speedy blade replacement (see e.g. U.S. Pat. No. 7,784,254). Even with the ability of speedy blade replacement, such blade replacement can bring a disadvantage unless its timing is appropriate.

SUMMARY OF THE INVENTION

Wear state of the blade cannot be decided based solely on its used period, as it will widely differ depending on its usage and/or a state of a work site. And, as a blade of a grass mower is covered by a mower deck, visual checking of its state requires turn-over of the mower deck after its dismounting from the machine body. Moreover, visual check of a damage or a crack in the blade requires detachment of the blade from its rotational shaft to allow for observation of the the blade from various angles.

A principal object of the present invention is to provide a technique for deciding a replacement timing of a blade without needing to dismounting of a mower deck and the blade from a machine body.

A grass mower according to the invention comprises:
a machine body;
a wheel unit mounted on the machine body; and
a mower unit mounted on the machine body;
wherein the mower unit includes a mower deck comprised of a top plate and a side plate extending downwards from the top plate, a rotational shaft extending through the top plate and rotatably supported to the top plate, and a blade attached to the rotational shaft inside the mower deck; and
wherein there are provided a vibration detection unit attached to the mower deck for detecting vibration in the mower deck and an informing unit for informing the vibration detected by the vibration detection unit.

The mower unit includes a mower deck comprised of a top plate and a side plate extending downwards from the top plate. And, to this top plate, a rotational shaft for rotating the cutter blade inside the mower deck is supported. As the mower deck is a bowl-like structure formed of plate members and the rotational shaft for rotating the blade is supported to the top plate, vibration occurs in the mower deck when the blade is rotated. This vibration includes abnormal vibration attributable to wear or crack in the blade, attachment failure between the blade and the rotational shaft, etc. This invention has been made by addressing to such abnormal vibration. As vibration in the mower deck detected by the vibration detection unit is informed via the informing unit, decision is made whether this detected vibration includes abnormal vibration or not. If abnormal vibration is included therein, then, maintenance of the blade such as replacement thereof will be carried out. Namely, according to the present invention, a driver can decide maintenance timing including blade replacement timing, without need to dismount the mower deck and the blade.

According to one preferred embodiment, there is provided an evaluation unit configured to electronically analyze vibration characteristics of the mower deck based on the detection signal from the vibration detection unit. In this case, by comparing the vibration characteristics with vibration characteristics of the mower deck at time of failure of the blade, service life of the blade is decided and result of decision will be informed.

The vibration detected by the vibration detection unit contains traveling vibration associated with traveling of the machine body by a large proportion. Then, in order to avoid masking of the vibration characteristics of the blade by such traveling vibration, when a state of the blade is to be decided, preferably, a detection signal of the vibration detection unit while the machine body stops its traveling is employed.

Between the time of traveling of the machine body and the time of traveling stop thereof, vibration of the mower deck widely differs. Thus, it is also possible to use the detection signal from the vibration detection unit as an input signal to a drive recorder.

The vibration detection unit and the informing unit employed in the grass mower are desired to be provided at low costs. For this reason, according to one preferred embodiment of the present invention, the vibration detection unit and the informing unit are integrated. According to one specific example of the vibration detection unit, at least partially transparent case accommodates a vibrator that moves with a greater amplitude with increase in vibration. Based on a movement of this vibrator, it is possible to decide whether the mower deck vibration is abnormal or not and eventually the replacement timing of the blade.

DETAILED DESCRIPTION

Figure 1:
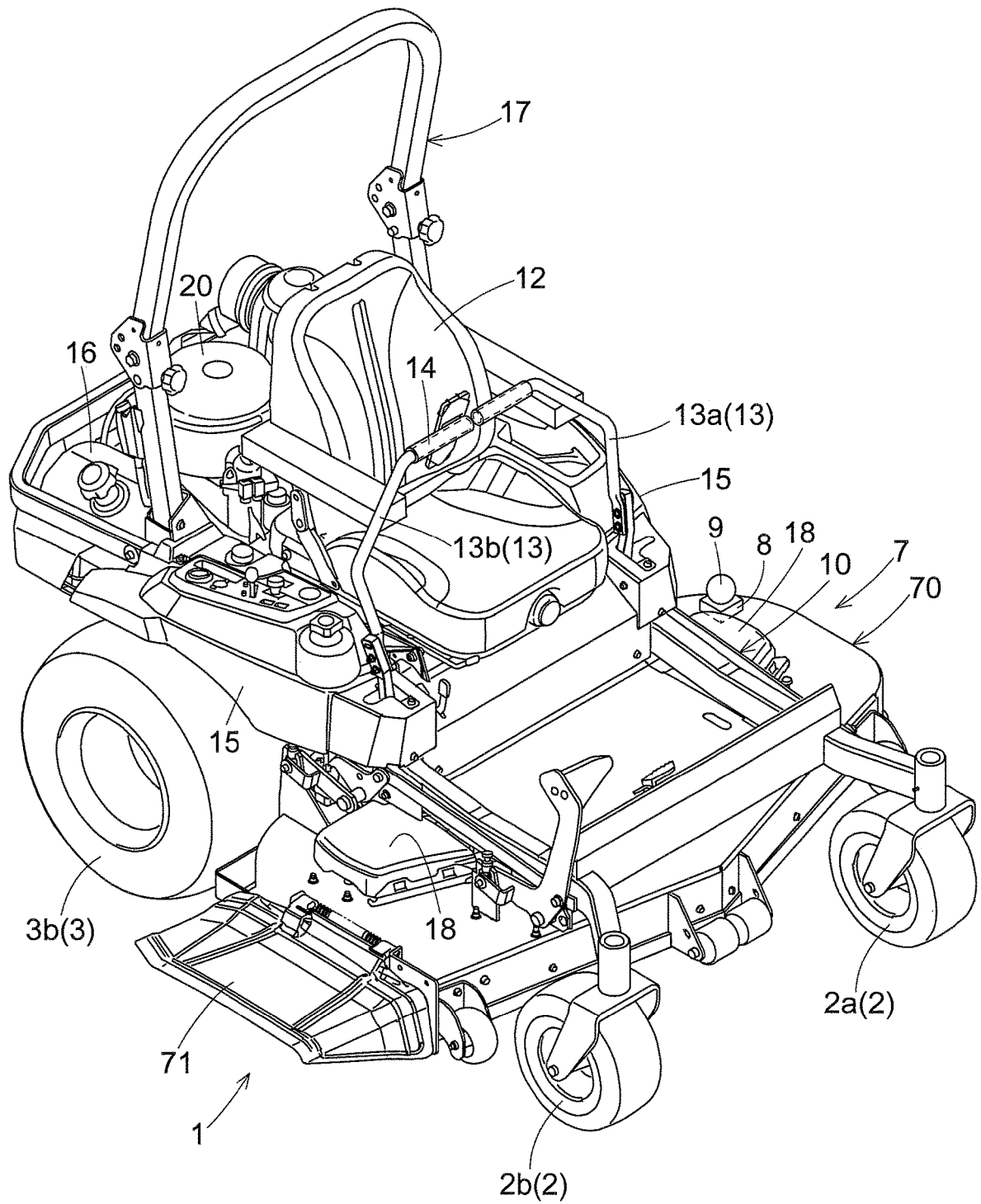
FIG. 1 is a perspective view of a grass mower.

Next, a grass mower according to the present invention will be explained with reference to the accompanying drawings. In this detailed discussion, unless explicitly indicated otherwise, the term "front" means the front side with respect to the machine body front/rear direction (traveling direction), and the term "rear" means the rear side with respect to the machine body front/rear direction (traveling direction). Also, the language "left/right direction" or "lateral direction" means the machine body transverse direction (machine body width direction) perpendicular to the machine body front/rear direction. The term "upper" or "lower" refers to positional relationship with respect to the perpendicular (vertical) direction of the machine body, denoting the ground clearance relationship.

The grass mower includes a machine body 1 supported on the ground by a front wheel unit 2 configured as a caster unit and a rear wheel unit 3. This grass mower is configured as a so-called zero-turn mower configured such that a left rear wheel 3a and a right rear wheel 2b together constituting the rear wheel unit 3 can be controlled independently of each other in their forward/reverse speeds. The front wheel unit 2 includes a pair of left and right front wheels 2a, 2b. The principal constituent component of the vehicle body 1 is a frame 10 formed of angular pipes, etc. Between the front wheel unit 2 and the rear wheel unit 3, a mower unit 7 is suspended from the frame 10 to be liftable up/down.

The mower unit 7 includes a side discharge type mower deck 70 and a discharge cover 71 provided on a cut grass discharging side of the mower deck 70.

The frame 10 extends in the front/rear direction and at a center portion of the frame 10, a driver's seat 12 is provided. On a top face of a front portion of the frame 10, a floor plate is laid to be used as a footrest for the driver. At a rear portion of the frame 10, there are provided an engine 20 which is an internal combustion engine and engine auxiliary devices. The engine 20 is mounted under a posture with an engine output shaft 21 (see FIG. 2) protruding downwards. On the lateral side of the engine 20, a fuel tank 16 is disposed.

On the left and right sides of the driver's seat 12, fenders 15 are provided. On top faces of the fenders 15, there are arranged user operation devices such as various operation levers and operation buttons, etc. Rearwardly of the driver's seat 12, an arch-shaped ROPS 17 is disposed vertically.

A maneuvering unit 13 which is one of the user operation devices mentioned above includes a left maneuvering lever 13a disposed on the left side of the driver's seat 12 and a right maneuvering lever 13b disposed on the right side of the driver's seat 12. The left maneuvering lever 13a is used for adjusting a rotational speed of the left rear wheel 3a. The right maneuvering lever 13b is used for adjusting a rotational speed of the right rear wheel 3b. The left maneuvering lever 13a and the right maneuvering lever 13b are pivotally displaceable to/across a forward speed changing range, neutral position and a reverse speed changing range.

Figure 2:
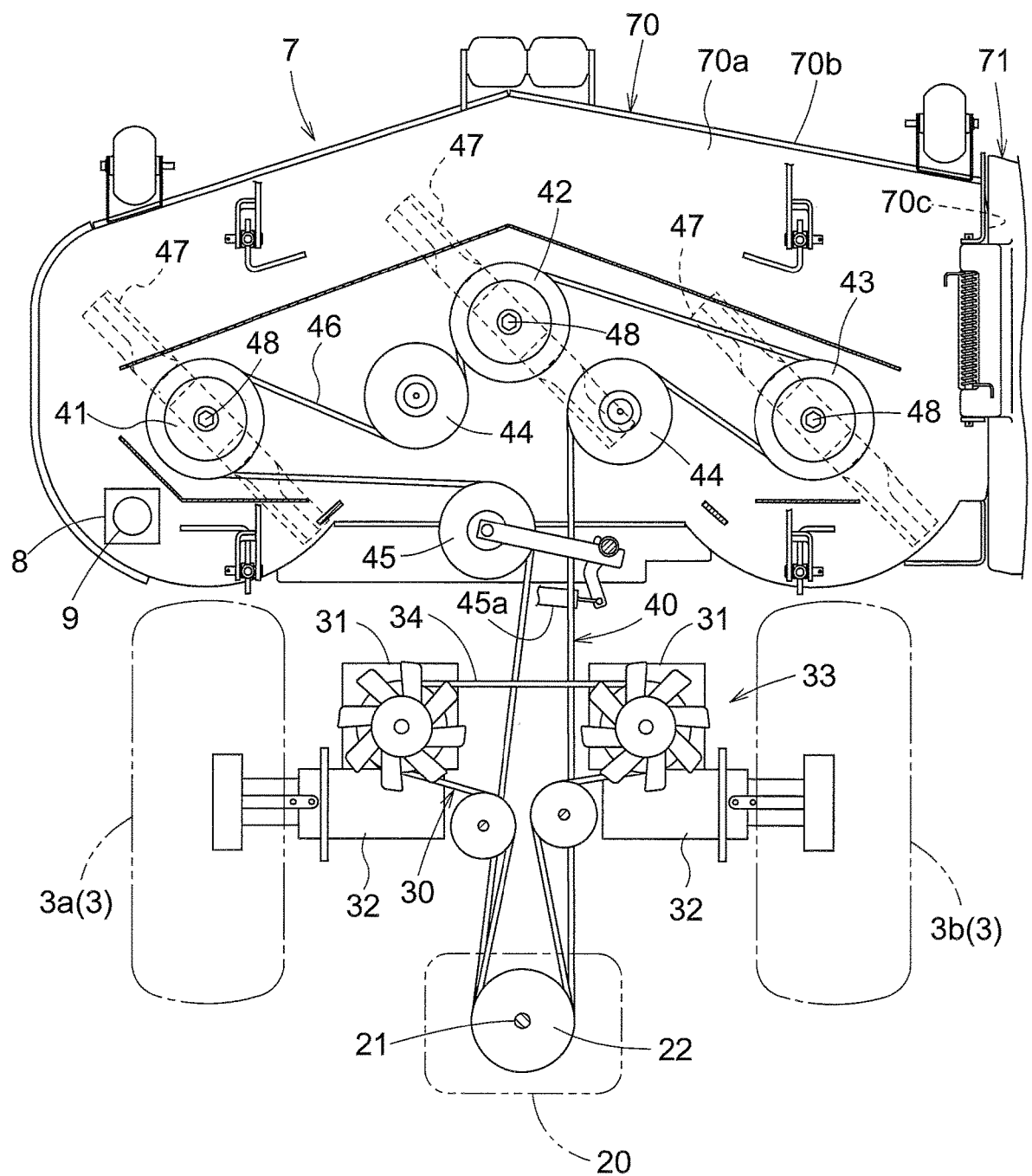
FIG. 2 is a power system diagram of the grass mower.

FIG. 2 schematically shows a power transmission system of this grass mower. This power transmission system includes a traveling transmission mechanism 30 for transmitting engine power to the rear wheel unit 3 and an implement transmission mechanism 40 for transmitting engine power to the mower unit 7. Power from the engine 20 is outputted via upper and lower output pulleys 22 mounted on the engine output shaft 21.

The traveling transmission mechanism 30 includes a pair of left and right HST's (hydrostatic transmission) 31, a pair of left and right gear transmission mechanisms 32 and a traveling belt transmission mechanism 33. The traveling belt transmission mechanism 33 transmits power outputted from the output pulleys 22 to the HST's 31 via a traveling belt 34. The gear transmission mechanisms 32 transmit power speed-changed by the HST's 31 to the left rear wheel 3a and the right rear wheel 3b.

Speed changing operations of the left and right HST's 31 are effected by control signals generated based on pivotal operations on the left maneuvering lever 13a and the right maneuvering left 13b. In response to user operations on the left maneuvering lever 13a and the right maneuvering lever 13b, there are realized a stopped state, a straight traveling state, a slow turning state, a pivot turning state and a spin turning state, respectively. The stopped state is realized by stopping the left rear wheel 3a and the right rear wheel 3b. The straight traveling state is realized by rotatably driving the left rear wheel 3a and the right rear wheel 3b at an equal speed forwardly or reversely. The slow turning state is realized by rotatably driving the left rear wheel 3a and the right rear wheel 3b at different speeds forwardly or reversely. the pivot turning state is realized by stopping one of the left rear wheel 3a and the right rear wheel 3b and rotatably driving the other forwardly or reversely. The spin turning state is realized by rotatably driving one of the left rear wheel 3a and the right rear wheel 3b forwardly and rotatably driving the other reversely.

As may be apparent from FIG. 2, the mower unit 7 includes the mower deck 70 consisting of a top plate 70a and a side plate 70b. As the side plate 70b includes only a front plate member, a rear plate member and a left plate member, the right side of the mower deck 70 remains opened and this opening functions as a cut grass discharging outlet 70c.

Figure 3:
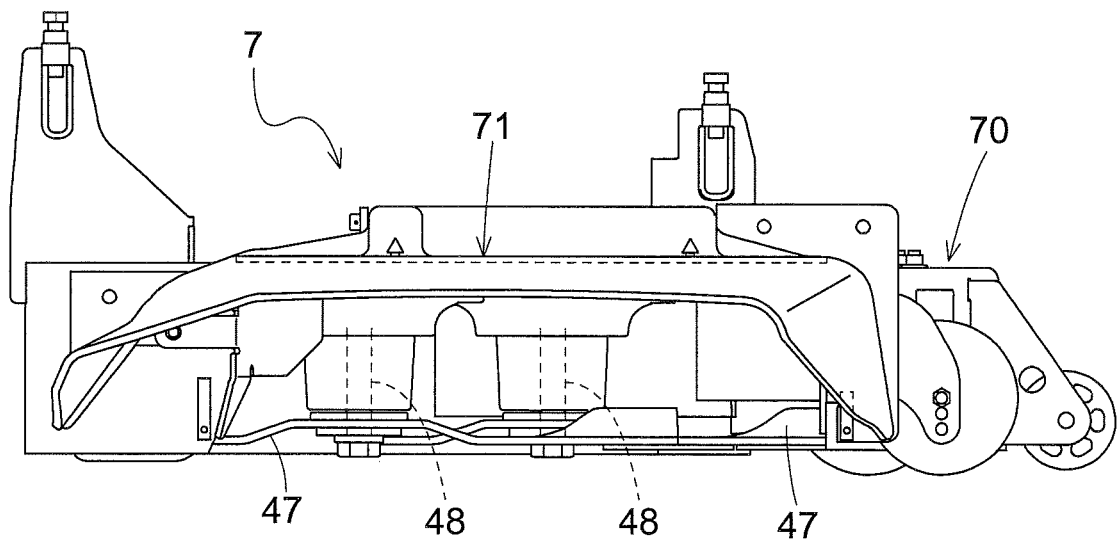
FIG. 3 is a side view of a mower deck.

In the inner space of the mower deck 70, as shown in FIG. 2 and FIG. 3, there are provided three blades 47 disposed side by side along the vehicle body transverse direction. Each blade 47 is fixed to a rotational shaft 48 rotatably supported to the top plate 70a of the mower deck 70. For transmitting the power of the engine 20 from the output pulleys 22 to the respective rotational shafts 48, the implement transmission mechanism 40 is provided. This implement transmission mechanism 40 is configured as an implement belt transmission mechanism. The implement transmission mechanism 40 includes input pulleys 41, 42, 43 fixed to the rotational shafts 48 of the respective blades 47, a direction changing pulley 44, a tension clutch pulley 45 as an implement clutch, and an implement belt 46 entrained around these pulleys. With this arrangement in operation, the respective blade 47 will be rotated at a rotational speed in proportion to an engine rotational speed. The tension clutch pulley 45 is switched to an engaged state or a disengaged state by a clutch solenoid 45a.

As shown in FIG. 1, the left input pulley 41 and the right input pulley 43 are exposed, so these are covered by a protection cover 18 from above.

Figure 4:
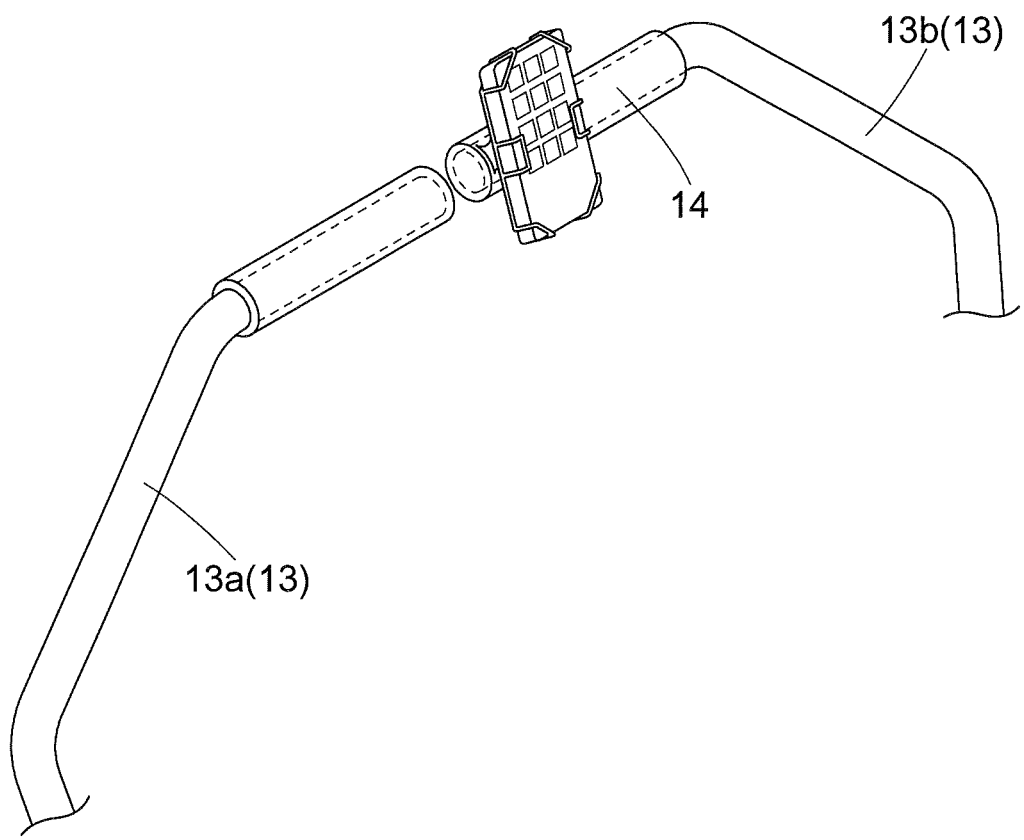
FIG. 4 is a perspective view showing adaptors provided in a left maneuvering lever and a right maneuvering lever.

As shown in FIG. 4, at free end portions of the left maneuvering lever 13a and the right maneuvering lever 13b, there are formed adaptor attaching portions on which the adaptors 14 are to be fitted. As such adaptors 14, there are prepared a great variety thereof, some being designed to act as mounts for a smart phone, a tablet computer or the like, others being designed as ornamental grips, and so on.

As shown in FIG. 1, on the top plate 70a of the mower deck 70, there are attached a vibration detection unit 8 for detecting vibration in the mower deck and an informing unit 9 for informing vibration detected by the vibration detection unit 8.

Figure 5:
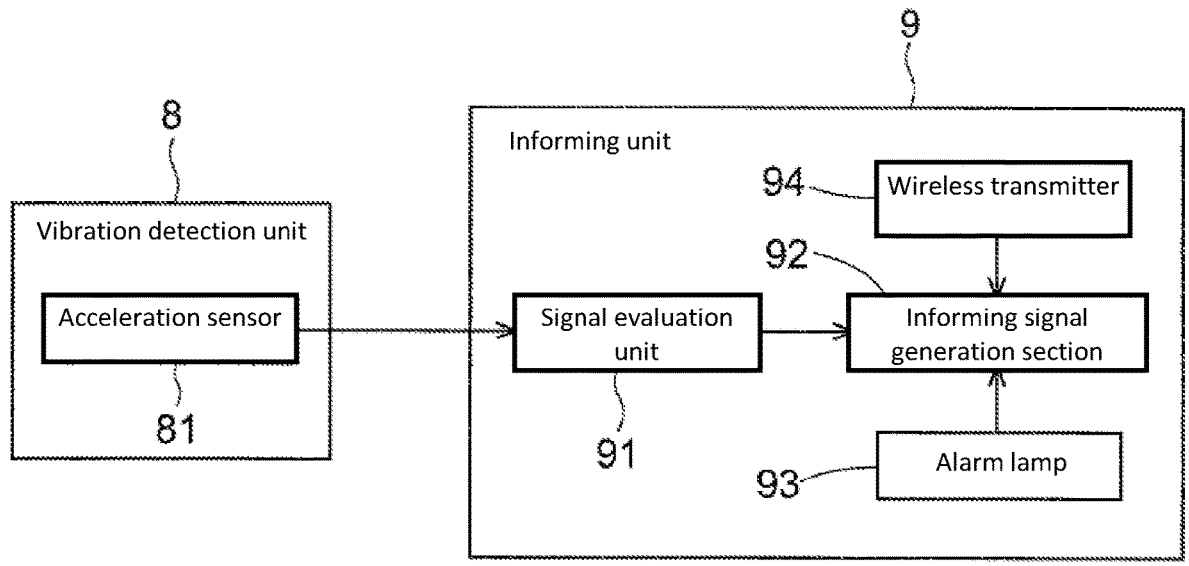
FIG. 5 is a functional block diagram of an informing unit.

As shown in FIG. 5, the vibration detection unit 8 includes an acceleration sensor 81 using a piezoelectric element. The informing unit 9 includes a signal evaluation section 91 and an informing signal generation section 92. The signal evaluation section 91 preprocesses a detection signal outputted from the acceleration sensor 81 and compares the amplitude and/or the frequency of the detection signal with that/those of reference data and decides whether detected vibration is abnormal vibration or not. This abnormal vibration includes also vibration which implicitly indicates a state requiring replacement of the blade 47. If the result of this decision is abnormal vibration, then, the informing signal generation section 92 generates an abnormal vibration informing signal or a blade failure informing signal.

This informing signal generation section 92 includes an alarm lamp 93 and a wireless transmitter 94. If such abnormal vibration informing signal or blade failure informing signal is generated, the alarm lamp 93 will be lit or flickered. Simultaneously, via the wireless transmitter 94, the abnormal vibration informing signal or blade failure informing signal will be transmitted to a smart phone attached to the adapter 14 of the maneuvering unit 13 or a smart phone carried by the driver, so that abnormal vibration or blade failure will be informed to the driver via the smart phone.

Figure 6:
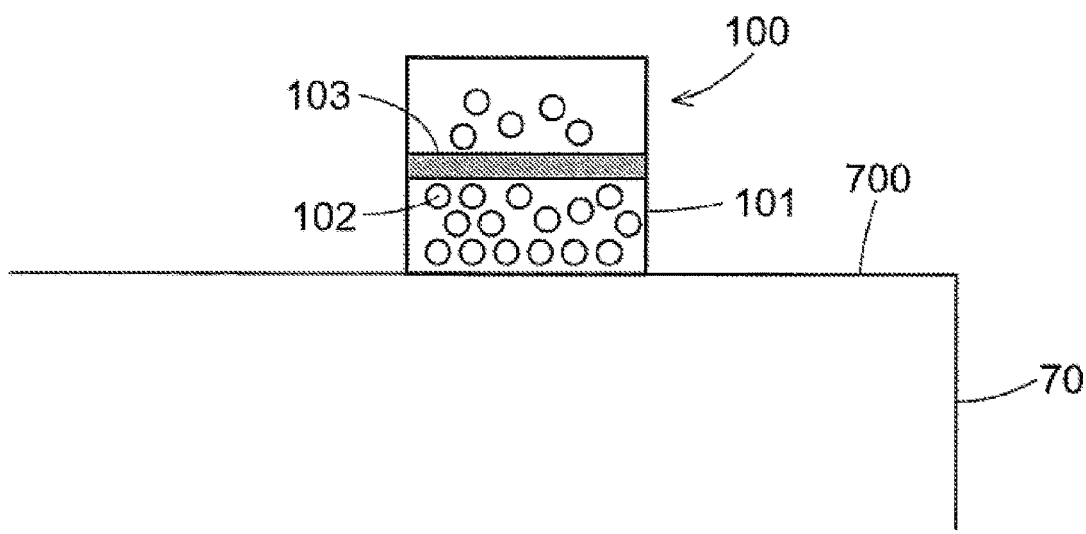
FIG. 6 is a schematic of a vibration detection informing unit.

FIG. 6 schematically shows one example of a vibration detection informing unit 100 integrating the vibration detection unit 8 and the informing unit 9 together. This vibration detection informing unit 100, in order to be clearly visible from a driver seated at the driver's seat 12, is attached to a left side rear corner portion of the top plate 70a of the mower deck 70. In this vibration detection informing unit 100, a plurality of plastic balls 102 are accommodated in a transparent plastic container 101. The plastic balls 102 are so light as to be capable of bouncing up/down within the container 101 when the vibration detecting container 101 is vibrated, so that the plastic balls 102 function as "vibrators" for visually indicating vibration of the mower deck 70. A horizontal line (band) drawn on the plastic container 101 is a vibration evaluation band 103. If the plastic balls 102 bounce up beyond this vibration evaluation band 103, it is decided that abnormal vibration is occurring.

Incidentally, the arrangements disclosed in the foregoing embodiment (including the further embodiments) can be used in combination with any combination disclosed in the other embodiments unless contradiction results from such combining. Further, the embodiments disclosed in this detailed description are illustrative and the present invention is not limited thereto, but various modifications thereof can be made when appropriate within a range not departing from the object of the invention.

The invention claimed is:

1. A grass mower comprising:
a machine body;
a wheel unit mounted on the machine body; and
a mower unit mounted on the machine body;
the mower unit comprising:
    a mower deck that includes a top plate and a side plate extending downwards from the top plate,
    a rotational shaft extending through the top plate and rotatably supported to the top plate, and
    a blade attached to the rotational shaft inside the mower deck; and
    a vibration detection unit attached to either an outside surface or the top plate of the mower deck, said vibration detecting unit being configured to detect vibration in the mower deck,
wherein the grass mower further comprises an informing unit mounted to a portion of the grass mower and configured to communicate information related to the vibration detected by the vibration detection unit.

2. The grass mower of claim 1, further comprising a blade life decision mechanism configured to decide service life of the blade based on the vibration detected by the vibration detection unit.

3. The grass mower of claim 1, further comprising a drive recorder for recording traveling state of the machine body based on the vibration detected by the vibration detection unit.

4. The grass mower of claim 1, wherein the vibration detection unit comprises an acceleration sensor.

5. The grass mower of claim 1, wherein:
the vibration detection unit and the informing unit are both arranged on unit that is attached to the top plate of the mower deck.

6. The grass mower of claim 5, wherein the unit attached to the top plate comprises a case which is at least partially transparent.

7. The grass mower of claim 1, wherein the vibration detecting unit comprises a vibrator.

8. The grass mower of claim 1, wherein the informing unit is an electronic device.

9. A grass mower comprising:
a machine body;
a wheel unit mounted on the machine body; and
a mower unit mounted on the machine body;
the mower unit comprising:
    a mower deck that includes a top plate and a side plate extending downwards from the top plate,
    a rotational shaft extending through the top plate and rotatably supported to the top plate, and
    a blade attached to the rotational shaft inside the mower deck;
    a vibration detection unit attached to the mower deck, said vibration detecting unit being configured to detect vibration in the mower deck; and
    an informing unit mounted to the mower deck and configured to communicate information related to the vibration detected by the vibration detection unit.

10. A grass mower comprising:
a machine body;
a wheel unit mounted on the machine body; and
a mower unit mounted on the machine body;
the mower unit comprising:
    a mower deck that includes a top plate and a side plate extending downwards from the top plate,
    a rotational shaft extending through the top plate and rotatably supported to the top plate, and
    a blade attached to the rotational shaft inside the mower deck;
    a vibration detection unit attached to the mower deck, said vibration detecting unit being configured to detect vibration in the mower deck; and
    an informing unit mounted to a portion of the mower unit and configured to communicate information related to the vibration detected by the vibration detection unit.

* * * * *

UNITED STATES PATENT AND TRADEMARK OFFICE
CERTIFICATE OF CORRECTION

PATENT NO. : 10,962,407 B2  
APPLICATION NO. : 16/233845  
DATED : March 30, 2021  
INVENTOR(S) : M. Asahara et al.

Page 1 of 1

It is certified that error appears in the above-identified patent and that said Letters Patent is hereby corrected as shown below:

In the Claims

Column 6, Line 9 (Claim 5) please change "on unit" to -- as a unit --

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*